United States Patent
Ohsawa et al.

(10) Patent No.: US 11,214,041 B2
(45) Date of Patent: Jan. 4, 2022

(54) OXYGEN-ABSORBING PACKAGING MATERIAL

(71) Applicant: Toyo Seikan Group Holdings, Ltd., Tokyo (JP)

(72) Inventors: Takafumi Ohsawa, Yokohama (JP); Yoshihiro Ohta, Yokohama (JP); Hiroki Komagata, Yokohama (JP)

(73) Assignee: Toyo Seikan Group Holdings, Ltd., Tokyo (JP)

(*) Notice: Subject to any disclaimer, the term of this patent is extended or adjusted under 35 U.S.C. 154(b) by 219 days.

(21) Appl. No.: 16/318,385

(22) PCT Filed: Jul. 19, 2017

(86) PCT No.: PCT/JP2017/026089
§ 371 (c)(1),
(2) Date: Jun. 18, 2019

(87) PCT Pub. No.: WO2018/016521
PCT Pub. Date: Jan. 25, 2018

(65) Prior Publication Data
US 2019/0351651 A1 Nov. 21, 2019

(30) Foreign Application Priority Data

Jul. 20, 2016 (JP) .............................. JP2016-142243

(51) Int. Cl.
*B32B 15/09* (2006.01)
*B32B 7/12* (2006.01)
(Continued)

(52) U.S. Cl.
CPC ............... *B32B 15/09* (2013.01); *B32B 7/12* (2013.01); *B32B 15/20* (2013.01); *B32B 27/08* (2013.01);
(Continued)

(58) Field of Classification Search
CPC ........... B32B 15/09; B32B 15/08; B32B 7/12; B32B 15/20; B32B 27/08; B32B 27/308;
(Continued)

(56) References Cited

U.S. PATENT DOCUMENTS 8,993,109 B2  3/2015 Yamamoto et al.
2003/0170479 A1* 9/2003 Peiffer .................. C08L 67/02
428/515

(Continued)

FOREIGN PATENT DOCUMENTS

EP  1391295 A1 * 2/2004 ............. B32B 27/16
JP  7-292129  11/1995
(Continued)

OTHER PUBLICATIONS

Nadkarni, V.M., Interrelationship Between the Crystallization Behavior, Injection Molding Conditions, and Morphology of Poly(Ethylene Terephthalate)/ Poly(Methyl Methacrylate) Alloys, Mar. 1987, Polymer Engineering and Science, vol. 27 No. 6, pp. 451-457 (Year: 1987).*

(Continued)

*Primary Examiner* — Eli D. Strah
*Assistant Examiner* — Thomas J Kessler
(74) *Attorney, Agent, or Firm* — Marshall, Gerstein & Borun LLP

(57) ABSTRACT

Provided is an oxygen-absorbing packaging material which is used for adhesive patches or the like containing an easily oxidizable component and an oily component, and which has improved tearability, while maintaining good heat seal strength. The present invention relates to an easily tearable oxygen-absorbing packaging material which has a multilayer structure comprising an oxygen barrier layer, an oxygen absorption layer and a sealant film, and wherein: the sealant film is a multilayer resin film that comprises at least (Continued)

a core layer and an inner layer having heat sealability; and the core layer contains 20-40% by mass of a cyclic polyolefin resin and/or an acrylic resin and 60-80% by mass of a polyethylene terephthalate resin relative to the total mass of the core layer.

10 Claims, 1 Drawing Sheet

(51) Int. Cl.
*B32B 15/20* (2006.01)
*B32B 27/08* (2006.01)
*B32B 27/30* (2006.01)
*B32B 27/32* (2006.01)
*B32B 27/36* (2006.01)
*B65D 65/40* (2006.01)

(52) U.S. Cl.
CPC .......... *B32B 27/308* (2013.01); *B32B 27/325* (2013.01); *B32B 27/36* (2013.01); *B65D 65/40* (2013.01); *B32B 2270/00* (2013.01); *B32B 2307/31* (2013.01); *B32B 2307/518* (2013.01); *B32B 2307/7244* (2013.01); *B32B 2439/70* (2013.01); *B32B 2439/80* (2013.01)

(58) Field of Classification Search
CPC ....... B32B 27/325; B32B 27/36; B32B 27/30; B32B 27/32; B32B 2720/00; B32B 2307/31; B32B 2307/518; B32B 2307/582; B32B 2307/7244; B32B 2439/70; B32B 2439/80; B32B 2255/10; B32B 2255/26; B65D 65/40
See application file for complete search history.

(56) References Cited

U.S. PATENT DOCUMENTS

| | | |
|---|---|---|
| 2006/0127642 A1 | 6/2006 | Peiffer et al. |
| 2013/0143734 A1* | 6/2013 | Ohta .................... B32B 7/12 502/402 |
| 2014/0083890 A1* | 3/2014 | Ishizaki ................ B32B 27/08 206/438 |
| 2016/0137554 A1* | 5/2016 | Sato ...................... C08J 7/06 428/446 |
| 2018/0170010 A1* | 6/2018 | Yoshimura ............. B32B 27/36 |

FOREIGN PATENT DOCUMENTS

| | | | |
|---|---|---|---|
| JP | H11-302405 A | 11/1999 | |
| JP | 2001329077 A | 11/2001 | |
| JP | 2003-535732 A | 12/2003 | |
| JP | 2006240221 A | 9/2006 | |
| JP | 2007-084599 A | 4/2007 | |
| JP | 2012-011588 | 1/2012 | |
| JP | 2014061187 A | 4/2014 | |
| JP | 2016120963 A | 7/2016 | |
| KR | 2014-0038893 A | 3/2014 | |
| WO | WO-2010/143737 A1 | 12/2010 | |
| WO | WO-2014141818 A1 * | 9/2014 | ............ B32B 27/32 |

OTHER PUBLICATIONS

English machine translation of the description for WO-2014141818-A1, obtained from ESPACENET (Year: 2014).*
Search Report and Written Opinion in International Application No. PCT/JP2017/026089 dated Sep. 5, 2017, 8 pages (translation of search report).
Office Action in KR 10-2019-7003950 dated Jun. 15, 2020, 9 pages.

* cited by examiner

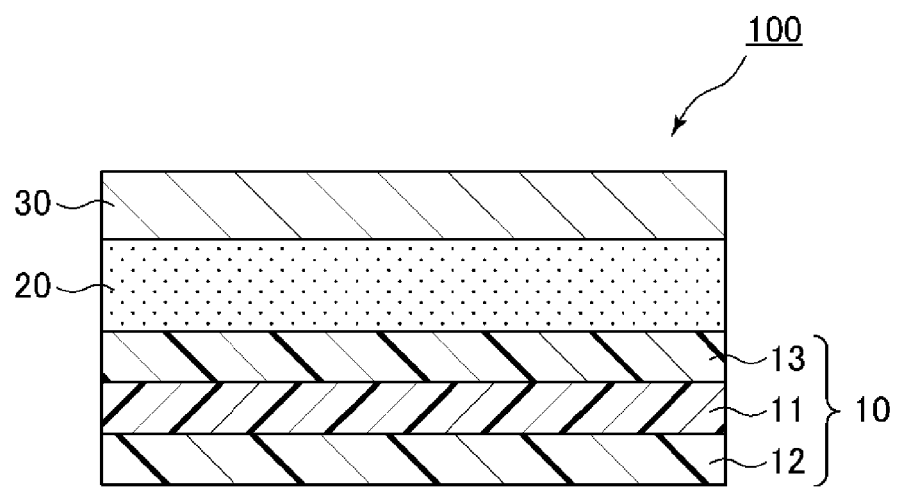

OXYGEN-ABSORBING PACKAGING MATERIAL

TECHNICAL FIELD

The present invention relates to an oxygen-absorbing packaging material, in particular to an oxygen-absorbing packaging material used for an adhesive patch containing an easily oxidizable component and an oily component.

BACKGROUND ART

Adhesive patches, in particular transdermal absorption adhesive patches containing drugs in pressure-sensitive adhesive layers, are hermetically packaged using a hermetic packaging material from the viewpoint of, for example, maintaining quality during storage. However, in the case of packaging an adhesive patch containing an easily oxidizable component and an oily component in a pressure-sensitive adhesive, the adhesive patch comes into contact with the inner surface of the packaging material or the easily oxidizable component and the oily component vaporize to cause these components to be adsorbed or migrated to the packaging material, resulting in changes in the contents of the easily oxidizable component and the oily component in the pressure-sensitive adhesive. In addition, in the case of transdermal absorption adhesive patches, problems have been pointed out such as a decrease in transdermal absorbability of the drugs contained and a decrease in pharmacological effects due to the adsorption of the contained drugs per se. Against such problems, there has been proposed a packaging material which is capable of preserving the adhesive patch for a long period of time by preventing the easily oxidizable component and the oily component contained in the pressure-sensitive adhesive of the adhesive patch from being adsorbed or migrated to the packaging material and by preventing discoloration and reduction in pharmacological effects due to oxidation (Japanese Patent Application Publication No. 2014-061187).

The packaging material thus obtained has not only the above characteristics but also a high heat seal strength and a high mechanical strength. However, the packaging material is poor in tear openability and there is room for improvement in order to make it easier for the user, particularly the elderly or children with weak strength, to open it.

Moreover, focusing on the object of improving the tearability of polyester films commonly used as a packaging material for foods and medicines, there have been proposed, for example, a biaxially oriented polyester film prepared by mixing polyethylene terephthalate with modified polybutylene terephthalate (PBT) and a biaxially oriented polyester film prepared by mixing polyethylene terephthalate with polycarbonate (PC) (Japanese Patent Application Publication No. H11-302405 and Japanese Patent Application Publication No. 2001-329077).

CITATION LIST

Patent Literatures

Patent Literature 1: Japanese Patent Application Publication No. 2014-061187
Patent Literature 2: Japanese Patent Application Publication No. H11-302405
Patent Literature 3: Japanese Patent Application Publication No. 2001-329077

SUMMARY OF INVENTION

Problems to be Solved by the Invention

The present invention aims to provide an oxygen-absorbing packaging material which is used for an adhesive patch and the like containing an easily oxidizable component and an oily component, where the oxygen-absorbing packaging material has an improved tearability while maintaining heat seal strength.

Means for Solution of the Problems

The present inventors have made earnest studies to find as a result that a film which is prepared by incorporating a certain amount of cyclic polyolefin-based resin and/or an acrylic resin in a polyethylene terephthalate-based resin can be used as an easily tearable film. The present invention has been completed by applying this material in a sealant film provided on the inner side of the packaging material.

Specifically, the present invention relates to a multilayer-structured oxygen-absorbing packaging material comprising: an oxygen barrier layer; an oxygen-absorbing layer; and a sealant film, wherein the sealant film is a multilayer resin film which at least includes a core layer and an inner layer having heat sealability, and the core layer contains 20 to 40% by mass of a cyclic polyolefin-based resin or an acrylic resin and 60 to 80% by mass of a polyethylene terephthalate-based resin based on a total mass of the core layer.

In addition, in the present invention, it is preferable that the core layer contain a cyclic olefin-based resin, and the cyclic olefin-based resin include a cyclic olefin copolymer (COC) resin.

In addition, in the present invention, it is preferable that the core layer contain an acrylic resin, and the acrylic resin include a polymethyl methacrylate (PMMA) resin.

In addition, in the present invention, it is preferable that the oxygen barrier layer be a laminate film including an aluminum foil and a biaxially oriented polyethylene terephthalate film.

In addition, in the present invention, it is preferable that the inner layer of the sealant film contain isophthalic acid-modified polyethylene terephthalate.

In addition, in the present invention, it is preferable that the inner layer and/or the core layer of the sealant film be an unstretched film.

In addition, in the present invention, it is preferable that the oxygen-absorbing layer be an oxygen-absorbing adhesive layer which contains an isocyanate-based curing agent and an oxygen-absorbing polyester polyol having an unsaturated alicyclic structure as an oxygen absorbing moiety.

In addition, in the present invention, it is preferable that the oxygen-absorbing polyester polyol be a polyester polyol which includes a structural unit derived from tetrahydrophthalic acid or a derivative thereof.

In addition, in the present invention, it is preferable that the sealant film be a multilayer resin film having a surface layer, the core layer, and the inner layer placed in this order, and the surface layer of the sealant film contain a polyethylene terephthalate-based resin.

In addition, the present invention relates to a packaging structure in which an adhesive patch is packed with the oxygen-absorbing package described above.

Advantageous Effects of Invention

The present invention provides an oxygen-absorbing packaging material which is used for e.g. an adhesive patch containing an easily oxidizable component and an oily component and which has an improved tearability while maintaining heat seal strength.

BRIEF DESCRIPTION OF DRAWINGS

FIG. 1 illustrates a schematic cross-sectional view of an embodiment of an oxygen-absorbing packaging material of the present invention.

DESCRIPTION OF EMBODIMENTS

<Configuration of Oxygen-Absorbing Packaging Material>

Hereinafter, a description is provided for the configuration of an oxygen-absorbing packaging material according to the present invention based on FIG. 1, a schematic cross-sectional view of an embodiment of the oxygen-absorbing packaging material of the present invention. However, the present invention is not limited to the embodiment of FIG. 1.

An oxygen-absorbing packaging material 100 of the present invention at least includes an oxygen barrier layer 30, an oxygen-absorbing layer 20, and a sealant film 10, where the sealant film 10 is a multilayer resin film at least including a core layer 11 and an inner layer 12 having heat sealability. In the sealant film 10, it is more preferable to employ a sandwich structure in which a surface layer 13 is further provided to cover the surface of the core layer 11 not in contact with the inner layer 12, sandwiching the core layer 11 with the surface layer 13 and the inner layer 12. The sealant film 10 includes the core layer 11, which contributes to the reduction in tear strength compared to the conventional heat seal layer and as a result to the reduction in the tear strength of the entire packaging material 100.

Each of the thicknesses of the core layer 11, the inner layer 12, and the surface layer 13 of the sealant film 10 is not particularly limited. However, if the ratio of the thickness of the core layer 11 to the entire thickness of the sealant film 10 is too small, there is a possibility that the tearability of the entire packaging material 100 may not be improved. If the ratio of the thickness of the core layer 11 to the entire thickness of the sealant film 10 is too large, there is a possibility that the sealant film may be broken at the time of film formation or lamination, and molding processability may be deteriorated. In addition, if the thickness of the inner layer 12 is too small, there is a possibility that the non-sorptivity of the oily component may decrease and the heat seal strength may decrease. If the thicknesses of the inner layer 12 and the surface layer 13 are too large, there is a possibility that the tear strength may increase and the tearability may not be improved. In light of the above, the thickness of each layer is set such that inner layer 12:core layer 11:surface layer 13 is at a ratio of preferably 10 to 30:40 to 80:10 to 30 and at a ratio of preferably 15 to 25:50 to 70:15 to 25. Specifically, the thickness of the core layer 11 is set to preferably 5 to 30 μm and more preferably 7 to 20 μm, the thickness of the inner layer 12 to preferably 1 to 10 μm and more preferably 2 to 7 μm, and the thickness of the surface layer 13 to preferably 1 to 10 μm and more preferably 2 to 7 μm.

In addition, although the thickness of the entire sealant film 10 can be set as appropriate in consideration of the thicknesses of the oxygen-absorbing layer 20 and the oxygen barrier layer 30, the thickness is preferably 10 to 50 μm, more preferably 10 to 35 μm, and further preferably 10 to 20 μm.

The thicknesses of the oxygen barrier layer 30 and the oxygen-absorbing layer 20 are not particularly limited. However, the thickness of the oxygen barrier layer 30 is preferably 1 μm to 30 μm and particularly preferably 1 μm to 25 μm, and the thickness of the oxygen-absorbing layer 20 is preferably 1 μm to 30 μm and particularly preferably 3 μm to 15 μm.

Additionally, the same type of layer as the adhesive layer and the pressure-sensitive adhesive layer, and the inner layer 12, the core layer 11, and the surface layer 13 may be provided as appropriate between the inner layer 12 and the core layer 11, between the surface layer 13 and the core layer 11, between the surface layer 13 and the oxygen-absorbing layer 20, and the core layer 11 and the oxygen-absorbing layer 20 (in the case of not including the surface layer 13). Specifically, the sealant film 10 can have various composite sandwich structures such as, for example, the configuration of inner layer/surface layer/core layer/surface layer, the configuration of inner layer/core layer/adhering layer/surface layer, or the configuration of inner layer/core layer/surface layer/core layer/surface layer. Moreover, the packaging material 100 may further include another appropriate functional layer (adhesive layer and the like) between the oxygen-absorbing layer 20 and the oxygen barrier layer 30 or on the oxygen barrier layer 30.

The present invention achieves an oxygen-absorbing packaging material having both heat seal strength and easy tearability which can prevent the easily oxidizable component and the oily component contained in the pressure-sensitive adhesive of the adhesive patch from adsorbing or migrating to the packaging material, can prevent discoloration and reduction in pharmacological effects due to oxidation, and can be preserved for a long period of time.

Here, the tear strength of the packaging material 100 of the present invention refers to a value measured in a pouch form using a tensile tester. The tear strength of the packaging material 100 in the flow direction and the vertical direction is, but not limited to, preferably 1.5 N and particularly preferably 1.0 N. It is possible to set the tear strength as appropriate depending on the use purpose of the packaging material 100. Furthermore, the tear strength of the film can be measured, for example, as a trouser type test piece of JIS K7128. Hereinafter, each of the layers is described in detail.

<Sealant Film>

Each layer included in the sealant film is preferably in a state of not being stretched or in a state of being stretched at a low magnification. Polyethylene terephthalate stretched at a high magnification is not preferable because its heat sealability is lost due to oriented crystallization.

<<Core Layer of Sealant Film>>

The core layer contains 20 to 40% by mass and preferably 25 to 40% by mass of cyclic polyolefin-based resin and/or acrylic resin, and 60 to 80% by mass and preferably 60 to 75% by mass of polyethylene terephthalate-based resin based on the total mass of the core layer. If the above-described composition ratio of the core layer is selected, it is possible to obtain a resin layer which has a sea-island structure in which the particles of the cyclic polyolefin-based resin and/or the acrylic resin are dispersed in the polyethylene terephthalate-based resin and to obtain a material having low tear strength. Moreover, the provided core layer contributes to the reduction in the tear strength of the entire sealant film and as a result to the reduction in the tear strength of the entire package. Furthermore, although the cyclic polyolefin-based resin and the acrylic resin may be mixed when used, it is preferable to use only one of them instead of mixing them.

The polyethylene terephthalate-based resin contained in the core layer of the present invention refers to a homopolymer or copolymerized polyester mainly composed of polyethylene terephthalate, and specifically refers to a polyester in which 80 mol % or more of the monomers of the dicarboxylic acid component and the glycol component is composed of terephthalic acid and ethylene glycol, respectively. As the dicarboxylic acid component other than terephthalic acid, it is possible to blend at least one selected from the group consisting of isophthalic acid (IA), orthophthalic acid, p-β-oxyethoxybenzoic acid, naphthalene 2,6-dicarboxylic acid, diphenoxyethane-4,4'-dicarboxylic acid, 5-sodium sulfoisophthalic acid, hexahydroterephthalic acid, adipic acid, sebacic acid, trimellitic acid, and pyromellitic acid. As an acid component, a copolymer added with isophthalic acid is more preferable, and the amount of isophthalic acid added is preferably 1 mol % to 15 mol % and particularly preferably 1 mol % to 5 mol % based on the entire dicarboxylic acid component.

In addition, the glycol component is preferably composed only of ethylene glycol. However, the glycol component may contain one or more selected from other glycol components, for example, propylene glycol, 1,4-butanediol, diethylene glycol, 1,6-hexylene glycol, cyclohexane dimethanol, ethylene oxide adduct of bisphenol A as long as the essence of the present invention is not impaired.

The cyclic polyolefin-based resin which can be contained in the core layer includes, for example, an addition copolymer of a cyclic olefin and a non-cyclic olefin, a ring-opening metathesis polymer of one or more cyclic polyolefins, and a polymer obtained by hydrogenating the ring-opening metathesis polymer. The cyclic olefin includes norbornene-based olefins, tetracyclododecene-based olefins, and dicyclopentadiene-based olefins (these cyclic polyolefins may be substituted with, for example, an alkyl group (preferably having 1 to 20 carbon atoms), an alkylidene group (preferably having 1 to 20 carbon atoms), an aralkyl group (preferably having 6 to 30 carbon atoms), a cycloalkyl group (preferably having 3 to 30 carbon atoms), a hydroxy group, an alkoxy group (preferably having 1 to 10 carbon atoms), an acetyl group, a cyano group, an amide group, an imide group, a silyl group, an aromatic ring, an ether bond, and an ester bond). In the present invention, the cyclic polyolefin-based resin used is preferably a cyclic olefin copolymer (COC) resin, more preferably a copolymer of a chain olefin having 2 to 10 carbon atoms and norbornene, and particularly preferably a copolymer of ethylene and norbornene from the viewpoint of economy and availability.

The acrylic resin which can be contained in the core layer is a polymer of an acrylic acid ester or a methacrylic acid ester, and as described above, polymethyl acrylate (PMA), polyethyl acrylate (PEA), polybutyl acrylate (PBA), polymethyl methacrylate (PMMA), and the like can be used. However, it is particularly preferable to use a polymethyl methacrylate (PMMA) resin from the viewpoint of economy and availability.

The core layer is obtained by blending a polyethylene terephthalate-based resin and a cyclic polyolefin-based resin and/or an acrylic resin, followed by formation into a film by a known means such as extrusion. Specifically, for example, there are a method in which chips of the polyethylene terephthalate-based resin and chips of the cyclic polyolefin-based resin and/or the acrylic resin are mixed before being charged into the extruder, and these mixture chips are charged into the extruder for melting, and a method in which chips of the polyethylene terephthalate-based resin and chips of the cyclic polyolefin-based resin and/or the acrylic resin are not mixed but charged into separate extruders for melting, and the polyethylene terephthalate-based resin and the cyclic polyolefin-based resin and/or the acrylic resin melted in these separate extruders are mixed and guided to a T-die prior to the extrusion from the die. Any method can be used. Note that the kneading temperature of the blend between the polyethylene terephthalate-based resin and the cyclic polyolefin-based resin and/or the acrylic resin is preferably 255° C. or more and less than 295° C. and more preferable 255° C. or more and less than 285° C. so that the core layer of the present invention is a resin layer having a sea-island structure with the particles of the cyclic polyolefin-based resin and/or the acrylic resin finely dispersed in the polyethylene terephthalate-based resin. In addition, the residence time of the blend resin in the extruder is preferably 5 minutes to 20 minutes.

<<Inner Layer of Sealant Film>>

The inner layer having heat sealability means the innermost layer of the packaging material and preferably contains isophthalic acid-modified polyethylene terephthalate. Moreover, the inner layer is preferably composed of an isophthalic acid-modified polyethylene terephthalate resin having a copolymerization ratio of the isophthalic acid component of 2 mol % to 20 mol %, more preferable 5 mol % to 20 mol %, and particularly preferably 10 mol % to 20 mol %. The isophthalic acid-modified polyethylene terephthalate-based resin having a copolymerization ratio of the isophthalic acid component within the above-mentioned range is particularly preferable because it is excellent in non-sorptivity of the oily component and has an excellent heat sealability. If the copolymerization ratio of isophthalic acid is less than 2 mol %, the heat sealability may be deteriorated due to crystallization at the time of film formation, and if the copolymerization ratio exceeds 20 mol %, there is a possibility that non-sorptivity decreases.

Various additives can be added to the inner layer as long as the heat seal characteristics and non-sorptivity are not impaired. The additives include antioxidants, ultraviolet absorbers, hydrolysis inhibitors, mildewcides, curing catalysts, plasticizers, pigments, fillers, lubricants such as silica, and the like. These additives are desirably within a range of 0% by mass to 10% by mass based on the total mass of the inner layer.

The inner layer can be formed by known film forming methods such as T-die molding and inflation molding. Here, it is preferable that the film in a hot melt state be solidified by rapid cooling. By rapid cooling, it is possible to suppress the crystallization of the resin and to obtain a film excellent in heat seal characteristics.

Furthermore, the inner layer is preferably in a state of not being stretched or being stretched at a low magnification. Polyethylene terephthalate stretched at a high magnification is not preferable because its heat sealability is lost due to oriented crystallization.

<<Surface Layer of Sealant Film>>

The surface layer is a layer covering at least the surface opposite to the surface in contact with the inner layer of the core layer, and preferably has a role of enhancing non-sorptivity of the oily component and a role of assisting the heat seal strength. The surface layer can be composed of a resin or the like and is preferably a layer composed of a polyethylene terephthalate-based resin. The layer is particularly preferably a layer composed of isophthalic acid-modified polyethylene terephthalate having a copolymerization ratio of the isophthalic acid component of 0 mol % to 5 mol % and preferably 1 mol % to 4 mol %.

Polyethylene terephthalate with a relatively high modification rate having a copolymerization ratio of the isophthalic acid component ranging from 2 mol % to 20 mol % preferable as the material for the inner layer is excellent in heat seal characteristic and has excellent non-sorptivity due to low crystallinity. On the other hand, polyethylene terephthalate with a low modification rate having a copolymerization ratio of the isophthalic acid component ranging from 0 mol % to 5 mol % preferable as the material for the inner layer has even high non-sorptivity. In addition, since polyethylene terephthalate having a low modification rate is widely used as a material for PET bottles in large amounts, it can be procured inexpensively and is excellent in economy. In other words, by forming the multilayer resin film structure in which the core layer is sandwiched between the surface layer and the inner layer composed of a polyethylene terephthalate-based resin, it is possible to achieve a sealant film excellent in heat sealing characteristic, non-sorptivity, and economical efficiency.

<Oxygen-Absorbing Layer>

The oxygen-absorbing layer is provided for the purpose of absorbing oxygen in order to avoid contact between the substance packaged in the packaging material and oxygen, and contains an oxygen-absorbing resin having an unsaturated alicyclic structure as an oxygen-absorbing moiety. The oxygen-absorbing resin having an unsaturated alicyclic structure as an oxygen-absorbing moiety generates a small amount of decomposition gas during an auto-oxidation reaction, that is, an oxygen-absorbing reaction. For this reason, it is superior as a packaging material for an adhesive patch, as compared with an oxygen absorbent composed of an unsaturated fatty acid having a large amount of decomposition gas produced or a chain hydrocarbon polymer having an unsaturated group. By suppressing the generation of decomposition gas such as aldehyde, ketone, carboxylic acid, alcohol, and the like, it is possible to suppress deterioration of the quality of the adhesive patch due to the chemical reaction between the decomposition gas and the components of the adhesive patch, thereby enabling long-term stable storage.

Oxygen-absorbing resins having an unsaturated alicyclic structure as an oxygen absorbing moiety include a polymer having a cyclohexene ring, for example an ethylene-methyl acrylate-cyclohexyl methyl acrylate copolymer and a polycondensation polymer made from a tetrahydrophthalic anhydride derivative. Additionally, it is also possible to use a cyclization reaction product of a conjugated diene-based polymer.

Preferable oxygen-absorbing resins having an unsaturated alicyclic structure as an oxygen absorbing moiety include an ethylenically unsaturated hydrocarbon resin such as polybutadiene resin, polyisoprene resin, or polyoctenylene resin, a resin using an unsaturated dicarboxylic acid such as maleic acid, fumaric acid, itaconic acid, or tetrahydrophthalic acid, or a derivative thereof as a raw material, a cyclized product of a conjugated diene polymer, a poly(ethylene-methyl acrylate/cyclohexene-methyl acrylate) resin, or the like.

These oxygen-absorbing resins may be used singly or in combination of two or more kinds of oxygen-absorbing resins.

Preferable oxygen-absorbing resins having an unsaturated alicyclic structure as an oxygen absorbing moiety include, for example, a resin obtained by polymerizing a raw material containing a monomer selected from the group consisting of the following monomer (i) and monomer (ii):

(i) a monomer in which carbon atoms, bonded to both groups having the following structures (a) and (b) and bonded to one or two hydrogen atoms, are contained in the unsaturated alicyclic structure;

(a) a carbon-carbon double bond group in the unsaturated alicyclic structure, (b) a group selected from the group consisting of functional groups containing heteroatoms, bonding groups derived from the functional groups, carbon-carbon double bond groups, and aromatic rings; and (ii) a monomer in which a carbon atom adjacent to the carbon-carbon double bond in the unsaturated alicyclic structure is bonded to an electron-donating substituent group and to a hydrogen atom, another carbon atom adjacent to that carbon atom is bonded to a functional group containing a heteroatom or to a bonding group derived from the functional group, and the electron donating substituent group and the functional group containing a heteroatom or the bonding group derived from the functional group are positioned in the cis-position.

The oxygen-absorbing resin which can be obtained by polymerizing a raw material containing the monomer (i) and the monomer (ii) is preferably a polyester which includes a structural unit derived from, for example, tetrahydrophthalic acid, tetrahydrophthalic anhydride, or a derivative thereof.

The acid components having the structure (i) can include $\Delta^2$-tetrahydrophthalic acid or a derivative thereof, $\Delta^3$-tetrahydrophthalic acid or a derivative thereof, $\Delta^2$-tetrahydrophthalic anhydride or a derivative thereof, and $\Delta^3$-tetrahydrophthalic anhydride or a derivative thereof. Preferable is $\Delta^3$-tetrahydrophthalic acid or a derivative thereof, or $\Delta^3$-tetrahydrophthalic anhydride or a derivative thereof. Particularly preferable is 4-methyl-$\Delta^3$-tetrahydrophthalic acid or a derivative thereof, or 4-methyl-$\Delta^3$-tetrahydrophthalic anhydride or a derivative thereof. The 4-methyl-$\Delta^3$-tetrahydrophthalic anhydride is industrially produced and can be obtained by, for example, structurally isomerizing an isomer mixture containing 4-methyl-$\Delta^4$-tetrahydrophthalic anhydride which is prepared by reacting a $C_5$ fraction of naphtha having isoprene as a main component with maleic anhydride.

The acid components having the structure (ii) are particularly preferably cis-3-methyl-$\Delta^4$-tetrahydrophthalic acid or a derivative thereof, or cis-3-methyl-$\Delta^4$-tetrahydrophthalic anhydride or a derivative thereof. The cis-3-methyl-$\Delta^4$-tetrahydrophthalic anhydride is industrially produced and can be obtained by, for example, reacting a $C_5$ fraction of naphtha having trans-piperylene as a main component with maleic anhydride.

The oxygen-absorbing polyester resin using tetrahydrophthalic acid or a derivative thereof as a raw material is preferable because the amount of decomposition products generated during the oxidation process is small. It is possible to produce the oxygen-absorbing polyester resin by a reaction of a diol component with tetrahydrophthalic acid or a derivative thereof, preferably a methyl tetrahydrophthalic anhydride isomer mixture. The diol component includes, for example, ethylene glycol, diethylene glycol, triethylene glycol, polyethylene glycol, propylene glycol, dipropylene glycol, polypropylene glycol, trimethylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexane dimethanol, 2-phenylpropanediol, 2-(4-hydroxyphenyl)ethyl alcohol, α,α-dihydroxy-1,3-diisopropylbenzene, o-xylene glycol, m-xylene glycol, p-xylene glycol, α,α-dihydroxy-1,4-diisopropylbenzene, hydroquinone, 4,4-dihydroxydiphenyl, naphthalenediol, or derivatives thereof, or the like. Preferable is an aliphatic diol such as diethylene glycol, triethylene glycol, or 1,4-butanediol. Further preferable is 1,4-butanediol. In the case of using 1,4-butanediol, it is possible to obtain an oxygen-absorbing polyester resin having a high oxygen-absorbing performance of the resin and a small amount of decomposition products generated during the oxidation process. These diol components can be used singly or in combination of two or more kinds.

In addition to tetrahydrophthalic acid or a derivative thereof, the oxygen-absorbing polyester resin may contain, as a raw material, other acid components and derivatives thereof such as aromatic dicarboxylic acid, aliphatic dicarboxylic acid, and aliphatic hydroxycarboxylic acid.

The aromatic dicarboxylic acid and derivatives thereof include, for example, benzenedicarboxylic acid such as phthalic acid, phthalic anhydride, isophthalic acid, and terephthalic acid, naphthalene dicarboxylic acid such as 2,6-naphthalene dicarboxylic acid, anthracene dicarboxylic acid, sulfoisophthalic acid, sodium sulfoisophthalate, or derivatives thereof. Preferable among these are phthalic acid, phthalic anhydride, isophthalic acid, and terephthalic acid.

The aliphatic dicarboxylic acid and derivatives thereof include, for example, oxalic acid, malonic acid, succinic acid, glutaric acid, adipic acid, pimelic acid, suberic acid, azelaic acid, sebacic acid, undecanedioic acid, dodecanedioic acid, 3,3-dimethylpentanedioic acid, or derivatives thereof. Preferable among these are adipic acid and succinic acid. Succinic acid is particularly preferable.

In addition, examples also include hexahydrophthalic acid having an alicyclic structure, dimer acid, and derivatives thereof.

The aliphatic hydroxycarboxylic acid and derivatives thereof include glycolic acid, lactic acid, hydroxypivalic acid, hydroxycaproic acid, hydroxyhexanoic acid, or derivatives thereof.

These acid components may be esterified, for example, dimethyl terephthalate or bis-2-hydroxydiethyl terephthalate. They may also be an acid anhydride such as phthalic anhydride or succinic anhydride.

In the present invention, the oxygen-absorbing polyester is preferably a polyester obtainable by copolymerizing a tetrahydrophthalic acid derivative, 1,4-butanediol, and succinic acid or succinic anhydride.

The oxygen-absorbing polyester resin used in the present invention can be obtained by any polyester polycondensation method known to those skilled in the art, such as interfacial polycondensation, solution polycondensation, melt polycondensation, and solid phase polycondensation.

In synthesizing the oxygen-absorbing polyester resin used in the present invention, polymerization catalysts available include, but are not necessarily required, usual polyester polymerization catalysts such as titanium type, germanium type, antimony type, tin type, and aluminum type. In addition, it is also possible to use known polymerization catalysts such as nitrogen-containing basic compounds, boric acid and boric acid esters, and organosulfonic acid-based compounds.

The number average molecular weight of the oxygen-absorbing polyester resin used in the present invention is preferably 500 to 100000 and more preferably 2000 to 10000. In addition, the weight average molecular weight is preferably 5000 to 200000, more preferably 10000 to 100000, and further preferably 20000 to 70000. Further, a transition metal catalyst may be added to the oxygen-absorbing resin to accelerate the oxygen-absorbing reaction. Examples of the transition metal catalyst include a transition metal salt composed of an organic acid and a transition metal such as manganese, iron, cobalt, nickel, or copper.

<<Oxygen-Absorbing Adhesive>>

The oxygen-absorbing adhesive means an adhesive containing the above-described oxygen-absorbing resin and a curing agent. It is desirable for the oxygen-absorbing resin to be contained in the oxygen absorbing layer in the form of an oxygen-absorbing adhesive. Examples of the adhesive include adhesives having an oxygen-absorbing function added to acrylic adhesive, urethane-based adhesive, epoxy-based adhesive, ethylene-vinyl acetate-based adhesive, vinyl chloride-based adhesive, silicone-based adhesive, rubber-based adhesive, and the like. Particularly in the case of use as an adhesive for dry lamination, a urethane-based adhesive is preferable, and a two-liquid curing type urethane-based adhesive is more preferable which is obtained by combining an isocyanate-based curing agent and a main agent composed of an oxygen-absorbing polyester resin.

It is possible to use various known isocyanates such as aromatic, aliphatic, or alicyclic compounds as the isocyanate-based curing agent. Examples of the aromatic diisocyanates include 4,4'-diphenylmethane diisocyanate and tolylene diisocyanate. Examples of the aliphatic isocyanate-based curing agent include xylylene diisocyanate (XDI), hexamethylene diisocyanate (HDI), lysine diisocyanate, lysine methyl ester diisocyanate, trimethylhexamethylene diisocyanate, and n-pentane-1,4-diisocyanate. Examples of the alicyclic isocyanate-based curing agent include isophorone diisocyanate (IPDI), cyclohexane-1,4-diisocyanate, methyl cyclohexyl diisocyanate, and dicyclohexylmethane-4,4'-diisocyanate. Among these, XDI and HDI are preferable as the aliphatic isocyanate-based curing agent, and IPDI is preferable as the alicyclic isocyanate-based curing agent. The above isocyanates and derivatives of isocyanates may be used singly or in combination of two or more kinds.

Furthermore, in the oxygen-absorbing adhesive, the ratio of the oxygen-absorbing resin to the curing agent is preferably 100:3 to 100:20 in terms of the solid content weight ratio.

An oxygen-absorbing polyester polyol which is used in the oxygen-absorbing adhesive layer and has an unsaturated alicyclic structure as an oxygen absorbing moiety is preferably a polyester polyol containing the above-described oxygen-absorbing polyester as a structural unit.

Note that the oxygen-absorbing adhesive in the present invention may contain, as necessary, various additives such as a silane coupling agent, an antioxidant, an ultraviolet absorber, a hydrolysis inhibitor, a mildewcide, a curing catalyst, a thickening agent, a plasticizer, a pigment, a filler, a polyester resin, and an epoxy resin.

<Oxygen Barrier Layer>

The oxygen barrier layer is composed of a material having a role of preventing permeation of oxygen or water vapor. The oxygen barrier layer is particularly preferably a laminate film including an aluminum foil and a biaxially oriented polyethylene terephthalate film for reasons of water vapor barrier properties and light shielding properties. In the packaging material, the multilayer is such that the biaxially oriented polyethylene terephthalate is on the outer side and the aluminum foil is on the inner side.

Other examples of the oxygen barrier layer suitably usable include vapor deposited thin films of metal or metal oxide such as silica or alumina, biaxially oriented polyester films having barrier coating layers composed mainly of a gas barrier organic material such as polyvinyl alcohol-based resin, ethylene-vinyl alcohol copolymer, polyacrylic acid-based resin, or vinylidene chloride-based resin, biaxially oriented nylon films, biaxially oriented polypropylene films, or the like.

Additionally, as the oxygen barrier layer, it is also possible to suitably use a biaxially oriented polyester film and a biaxially oriented nylon film coated with a hybrid barrier agent composed of an organic material and an inorganic material. Moreover, the oxygen barrier layer may be an ethylene-vinyl alcohol copolymer film, a polymethaxylylene adipamide film, a polyvinylidene chloride-based film, or a metal foil such as aluminum foil. Furthermore, as the oxygen barrier layer, it is also possible to use a multilayer body of layers of the same type or of layers of two or more types.

<Method of Producing Oxygen-Absorbing Packaging Material>

An extrusion molding method known per se can be used for production of the packaging material. For example, a multilayer body can be formed by extrusion molding using a multilayer multiple die and using extruders the number of which depends on the type of resin. Furthermore, an extrusion coating method or a sandwich lamination can be used, and a multilayer body can be produced by a dry lamination method of a premolded film.

The multilayer body can be formed into a packaging bag by bagging into a three or four side sealed ordinary pouch, a pouch with a gusset, a standing pouch, a pillow pouch, and the like. The bagging can be carried out by a known bagging method.

<Adhesive Patch Packaged in Packaging Material>

The adhesive patch packaged with the above-described packaging material includes a support layer and a pressure-sensitive adhesive layer. A drug is blended in the pressure-sensitive adhesive layer for the purpose of transdermally absorbing the drug to treat or prevent various diseases. The drug mentioned here is not particularly limited, and both a systemic agonist and a local agonist can be used. Examples of such drug include corticosteroid agents, non-steroidal anti-inflammatory agents, anti-rheumatic agents, sleeping pills, antipsychotics, antidepressants, mood stabilizers, psychostimulants, anxiolytics, antiepileptics, migraine therapeutic agents, Parkinson's disease therapeutic agents, muscarinic receptor antagonists, restless legs syndrome therapeutic agents, cerebral circulation/metabolism improving agents, anti-dementia agents, autonomic nerve agonists, muscle relaxants, antihypertensives, diuretics, hypoglycemic agents, therapeutic agents for hyperlipemia, gout therapeutic agents, general anesthetics, local anesthetics, antimicrobial agents, antifungal agents, antiviral agents, antiparasitic agents, vitamins, angina pectoris treatment agents, vasodilators, antiarrhythmic agents, antihistamines, mediator release inhibitors, leukotriene antagonistic hormonal agents, thyroid hormone agents, antithyroid agents, antitumor agents, antiemetics, anti-motion sickness agents, bronchodilators, cough suppressants, expectorants, smoking cessation aids, anti-osteoporosis agents, and the like. These drugs may be used in the free form or in the form of a salt. In addition, these drugs may be used singly or in combination of two or more kinds.

The adhesive patch used in the present invention contains an easily oxidizable component susceptible to oxygen, specifically a compound containing at least one of an amino group, a benzyl group, a thiol group, and a carbonyl group in the molecule. Examples thereof include compounds having amines, amides, cyclic amines, lactones, or a carboxylic acid structure.

The support layer is not particularly limited as long as it has no significant discomfort when applied. Specific examples thereof include single films composed of synthetic resins such as polyolefins like polyester, polyethylene, or polypropylene, polyvinyl chloride, plasticized polyvinyl chloride, plasticized vinyl acetate-vinyl chloride copolymer, polyvinylidene chloride, ethylene-vinyl acetate copolymer, cellulose acetate, ethyl cellulose, ethylene-ethyl acrylate copolymer, polytetrafluoroethylene, polyurethane, or ionomer resin, laminate films thereof, porous films or sheets made of rubber, the synthetic resins described above, polyester such as polyethylene terephthalate, or polyamide such as nylon, nonwoven fabrics, woven fabrics, or laminates including these and synthetic resin films described above, or the like.

The adhesive patch is preferably a transdermally absorbable formulation and preferably has a pressure-sensitive adhesive layer containing a transdermally absorbable drug on one side of the support. Further, it may include a release film which is placed on the other surface of the pressure-sensitive adhesive layer and is subjected to a release treatment.

The form of the adhesive patch is a planar flat form. The planar shape may be, but is not limited to, a substantially rectangular shape as well as a polygon such as a triangle or a pentagon, that is, a shape which is outlined by a substantially straight line, a shape that is outlined by a curve such as an ellipse or a circle, a combination thereof, or the like.

The size of the adhesive patch can be appropriately selected depending on, for example, the usage purpose and the site of application of the adhesive patch. For example, when the shape of the adhesive patch is substantially rectangular, in general, the length of one side thereof is 15 mm to 90 mm and the length of another side is also 15 mm to 90 mm.

The total thickness of the adhesive patch is usually 50 µm to 2000 µm and preferably 100 µm to 1000 µm. Moreover, although the adhesive patch includes a support layer and a pressure-sensitive adhesive layer, the support layer usually has a thickness of 1 µm to 1000 µm, and the pressure-sensitive adhesive layer is usually 10 µm to 200 µm, preferably 15 µm to 150 µm.

The pressure-sensitive adhesive layer may contain an oily component. The oily component contained plasticizes the pressure-sensitive adhesive layer to impart a soft feel, reducing skin irritation and adjusting the transdermal absorbability of the drug. The oily component is preferably an oily component in a liquid state at room temperature (25° C.) or, in the case of using a mixture of two or more kinds, an oily component in which the mixture finally becomes liquid at room temperature (25° C.). Examples of such oily component include, for example, higher alcohols such as oleyl alcohol and octyldodecanol; polyhydric alcohols such as glycerin, ethylene glycol, and polypropylene glycol; higher fatty acids such as caprylic acid and oleic acid; fatty acid esters such as isopropyl myristate, isopropyl palmitate, and ethyl oleate; polybasic acid esters such as diethyl sebacate and diisopropyl adipate; polyhydric alcohol fatty acid esters such as diglyceryl triisostearate, sorbitan monooleate, propylene glycol dicaprylate, polyethylene glycol monolaurate, polyoxyethylene sorbitol tetraoleate; polyoxyethylene alkyl ethers such as polyoxyethylene lauryl ether; hydrocarbons such as squalane and liquid paraffin; vegetable oils such as olive oil and castor oil; silicone oils; pyrrolidones such as N-methylpyrrolidone and N-dodecylpyrrolidone; and sulfoxides such as decyl methyl sulfoxide. These oily components may be used singly or in combination of two or more kinds.

The shape of the package for the adhesive patch of the present invention is not particularly limited as long as it is a shape capable of packaging the adhesive patch. Examples thereof include a substantially rectangular shape such as a square shape and a rectangular shape as well as a polygon such as a triangle or a pentagon, a circle, an ellipse, and other figures. In addition, the shape of the package for the adhesive patch and the shape of the adhesive patch to be packaged may be the same or different as long as individual packaging (sealing) of the adhesive patch is possible.

EXAMPLES

Hereinafter, the present invention will be specifically described with reference to Examples, but the present invention is not limited to these examples at all, and may be appropriately changed without departing from the scope of the present invention.

The values were measured by the following method.

(1) Number Average Molecular Weight (Mn) and the Weight Average Molecular Weight (Mw)

Measurement was carried out by gel permeation chromatography (GPC, manufactured by Tosoh Corporation; HLC-8120 type GPC) in terms of polystyrene. Chloroform was used as a solvent.

(2) Glass Transition Temperature: Tg

A differential scanning calorimeter (DSC 6220, manufactured by Seiko Instruments Inc.) was used to measure the temperature in a nitrogen stream at a rate of temperature rise of 10° C./min.

(3) Melt Flow Rate (MFR)

Measurement was carried out in accordance with JIS K7210 under the conditions of a temperature of 230° C. and a load of 3.80 kg (unit: g/10 min).

(4) Melt Volume Rate (MVR)

Measurement was carried out in accordance with JIS K7210 under the conditions of a temperature of 260° C. and a load of 2.16 kg (unit: cm$^3$/10 min).

(5) Tear Strength

A flat pouch of 100 mm×100 mm (seal width 10 mm) was prepared in advance, and a notch with a slit length of 10 mm was made in the middle of each side. A tensile tester was used to measure the tear strength at a test rate of 200 mm/min under an environment of 23° C.-50% RH. Here, the average test force at the stroke range of 40 to 140 mm was taken as the tear strength. In the examples and the comparative examples, those having a tear strength in MD (flow direction) and TD (vertical direction) of 1.5 N/mm or less were judged as acceptable.

Into a 3 L separable flask equipped with a stirrer, a nitrogen inlet tube, and a Dean-Stark type water separator, a methyltetrahydrophthalic anhydride isomer mixture (Hitachi Chemical Company, Ltd.; HN-2200) as an acid component at a molar ratio of 0.9, succinic anhydride as another acid component at a molar ratio of 0.1, 1,4-butanediol as a diol component in a molar ratio of 1.3, and 300 ppm of isopropyl titanate as a polymerization catalyst were placed, followed by reaction for about 6 hours in a nitrogen atmosphere at 150° C. to 200° C. while removing water generated. Subsequently, polymerization was carried out at 200 to 220° C. under a reduced pressure of 0.1 kPa for about 3 hours to obtain an oxygen-absorbing polyester resin (A). The oxygen-absorbing polyester resin (A) had Mn of 5200 and Mw of 54600.

Into the resulting oxygen-absorbing polyester resin (A), an HDI/IPDI-based curing agent (KL-75 manufactured by DIC Graphics Corporation) was mixed as an isocyanate-based curing agent to 10 phr (parts per hundred resin) in terms of solid content, followed by dissolution in ethyl acetate to prepare an ethyl acetate solution of an oxygen-absorbing adhesive resin composition with a solid concentration of 32 wt %.

As an oxygen barrier layer, a dry laminate film including an aluminum foil having a thickness of 7 μm, a urethane-based adhesive layer, and a biaxially oriented PET film having a thickness of 12 μm was prepared. A multilayer was formed by laminating with a dry laminator the sealant film, which was a multilayer resin film having a total thickness of 17 mm, by use of an ethyl acetate solution of the oxygen-absorbing adhesive resin composition so that the amount of adhesive applied was 4.5 g/m$^2$. Furthermore, the resultant was stored at 35° C. under a nitrogen atmosphere for 5 days. Then, an oxygen-absorbing multilayer film composed of oxygen barrier layer/oxygen-absorbing layer/sealant film was obtained.

The above-described sealant film used was a three-layer structure multilayer film having a surface layer in contact with the oxygen-absorbing layer, a core layer being an unstretched resin layer, and an inner layer serving as a heat seal surface placed in this order. The surface layer of the multilayer film is PET/IA 2 simple substance, and the inner layer serving as the heat seal surface is PET/IA 15 to which spherical silica having an average particle diameter of 2.5 μm is added as a lubricant. The material of the core layer sandwiched between the surface layer and the inner layer is a mixture obtained by mixing at 270° C. the resins having the blend ratio shown in Table 2. These three-layer materials were simultaneously kneaded at a molding temperature of 270° C. using an extruder and coextruded to obtain a sealant film composed of a multilayer resin film having a total thickness of 17 μm. Here, the thickness of each layer of the multilayer resin film was set to surface layer:core layer:inner layer=3.6:9.8:3.6 μm.

Materials used for the film are shown below.

TABLE 1

| Abbreviation | Formal Name |
|---|---|
| PET/IA 2 | Isophthalic Acid-Modified Polyethylene Terephthalate Resin (Copolymerization Ratio of Isophthalic Acid Component 2 mol %, IV: 0.83, Tg: 75° C.) |
| PET/IA 15 | Isophthalic Acid-Modified Polyethylene Terephthalate Resin (Copolymerization Ratio of Isophthalic Acid Component 15 mol %, IV: 0.9, Tg: 75° C.) |
| PMMA 1 | Polymethyl Methacrylate (MFR: 2, Tg: 120° C.) |
| PMMA 2 | Polymethyl Methacrylate (MFR: 8, Tg: 109° C.) |
| PMMA 3 | Polymethyl Methacrylate (MFR: 15, Tg: 102° C.) |
| COC 1 | Cyclic Polyolefin Copolymer (Copolymerization Ratio of Ethylene And Norbornene 18:82, MVR: 4, Tg: 158° C.) |
| COC 2 | Cyclic Polyolefin Copolymer (Copolymerization Ratio of Ethylene And Norbornene 20:80, MVR: 14, Tg: 138° C.) |
| PTT | Polytrimethylene Terephthalate (MFR: 19.3, IV: 1.08, Tg: 48° C.) |
| PBT | Polybutylene Terephthalate (IV: 1.18, Tg: 42° C.) |

A flat pouch was produced using the obtained oxygen-absorbing multilayer film to carry out a tear test. Table 1 shows measurement results of tear strength in MD (flow direction) and TD (vertical direction).

TABLE 2

| No. | Core Layer Configuration | Tear Strength (N) | |
|---|---|---|---|
| | | MD | TD |
| Example 1 | PET/IA 2:PMMA 1 = 70:30 | 0.68 | 1.23 |
| Example 2 | PET/IA 2:PMMA 1 = 65:35 | 0.55 | 0.63 |

TABLE 2-continued

| No. | Core Layer Configuration | Tear Strength (N) MD | TD |
|---|---|---|---|
| Example 3 | PET/IA 2:PMMA 2 = 70:30 | 0.80 | 0.65 |
| Example 4 | PET/IA 2:PMMA 2 = 65:35 | 0.54 | 0.56 |
| Example 5 | PET/IA 2:PMMA 3 = 70:30 | 1.09 | 1.45 |
| Example 6 | PET/IA 2:COC 1 = 70:30 | 0.67 | 0.72 |
| Example 7 | PET/IA 2:COC 1 = 65:35 | 0.60 | 0.69 |
| Example 8 | PET/IA 2:COC 2 = 70:30 | 0.78 | 0.97 |
| Example 9 | PET/IA 2:COC 2 = 65:35 | 0.55 | 0.92 |
| Comparative Example 1 | PET/IA 2 | 2.97 | 2.72 |
| Comparative Example 2 | PET/IA 2:PTT = 30:70 | 2.01 | 1.56 |
| Comparative Example 3 | PET/IA 2:PTT = 50:50 | 2.04 | 1.56 |
| Comparative Example 4 | PET/IA 2:PTT = 70:30 | 2.57 | 2.27 |
| Comparative Example 5 | PET/IA 2:PBT = 70:30 | 1.59 | 1.65 |

As shown in Table 2, if the core layer was an unstretched resin layer containing a cyclic polyolefin-based resin or an acrylic resin and a polyethylene terephthalate-based resin, it was possible to achieve a low tear strength in each of the flow direction and the vertical direction of the packaging material.

It should be considered that the embodiments and examples disclosed here are examples in all respects and are not restrictive. The scope of the present invention is shown not by the above description but by the scope of claims, and it is intended to include all modifications within the scope and the meanings equivalent to the claims.

What is claimed is:

1. A packaging bag which is formed with a multilayer-structured oxygen-absorbing packaging material comprising:
    an oxygen barrier layer;
    an oxygen-absorbing layer; and
    a sealant film,
    wherein:
    the sealant film is a three-layer structure multilayer resin film which includes a surface layer, a core layer, and an inner layer having heat sealability,
    the core layer contains 30% by mass to 35% by mass of a polymethyl methacrylate (PMMA) resin having a melt flow rate (MFR) of 2 to 8 and 65% by mass to 70% by mass of an isophthalic acid-modified polyethylene terephthalate-based resin having a copolymerization ratio of an isophthalic acid component of 1 mol % to 5 mol % based on a total mass of the core layer,
    each layer included in the sealant film is unstretched film, wherein the inner layer of the sealant film contains an isophthalic acid-modified polyethylene terephthalate having a copolymerization ratio of an isophthalic acid component of 10 mol % to 20 mol %, wherein the sealant film is a three-layer structure multilayer resin film having the surface layer, the core layer, and the inner layer placed in this order,
    the surface layer of the sealant film is composed of only an isophthalic acid-modified terephthalate-based resin having a copolymerization ratio of an isophthalic acid component of 1 mol % to 5 mol %,
    the packaging bag has a tear strength in MD (flow direction) and TD (vertical direction) of 1 N or less, when measured at a test rate of 200 mm/min under conditions having a temperature of 23° C. and a relative humidity of 50%,
    the core layer has a sea-island structure in which particles of the polymethyl methacrylate (PMMA) resin are dispersed in the isophthalic acid-modified polyethylene terephthalate-based resin,
    a thickness ratio of the inner layer/the core layer/the surface layer is 15 to 25:50 to 70:15 to 25, and
    an entire thickness of the sealant film is 10 μm to 20 μm.

2. The packaging bag according to claim 1, wherein the oxygen barrier layer is a laminate film including an aluminum foil and a biaxially oriented polyethylene terephthalate film.

3. The packaging bag according to claim 1, wherein the oxygen-absorbing layer is an oxygen-absorbing adhesive layer which contains an isocyanate-based curing agent and an oxygen-absorbing polyester polyol having an unsaturated alicyclic structure as an oxygen absorbing moiety.

4. The packaging bag according to claim 3, wherein the oxygen-absorbing polyester polyol is a polyester polyol which includes a structural unit derived from tetrahydrophthalic acid or a derivative thereof.

5. A packaging structure in which an adhesive patch is packed with the packaging bag according to claim 1.

6. A packaging bag which is formed with a multilayer-structured oxygen-absorbing packaging material comprising:
    an oxygen barrier layer;
    an oxygen-absorbing layer; and
    a sealant film,
    wherein:
    the sealant film is a three-layer structure multilayer resin film which includes a surface layer, a core layer, and an inner layer having heat sealability,
    the core layer contains 30% by mass to 35% by mass of a cyclic olefin copolymer (COC) resin having a melt volume rate (MVR) of 4 to 14 and 65% by mass to 70% by mass of an isophthalic acid-modified polyethylene terephthalate-based resin having a copolymerization ratio of the isophthalic acid component of 1 mol % to 5 mol % based on a total mass of the core layer,
    each layer included in the sealant film is unstretched film, wherein the inner layer of the sealant film contains an isophthalic acid-modified polyethylene terephthalate having a copolymerization ratio of the isophthalic acid component of 10 mol % to 20 mol %, wherein the sealant film is a three-layer structure multilayer resin film having the surface layer, the core layer, and the inner layer placed in this order,
    the surface layer of the sealant film is composed of only an isophthalic acid-modified polyethylene terephthalate-based resin having a copolymerization ratio of the isophthalic acid component of 1 mol % to 5 mol %,
    the packaging bag has a tear strength in MD (flow direction) and TD (vertical direction) of 1 N or less, when measured at a test rate of 200 mm/min under conditions having a temperature of 23° C. and a relative humidity of 50%,
    the core layer has a sea-island structure in which particles of the cyclic olefin copolymer (COC) resin are dispersed in the isophthalic acid-modified polyethylene terephthalate-based resin, and
    a thickness ratio of the inner layer/the core layer/the surface layer is 15 to 25:50 to 70:15 to 25,
    wherein an entire thickness of the sealant film is 10 μm to 20 μm.

7. The packaging bag according to claim 6, wherein the oxygen barrier layer is a laminate film including an aluminum foil and a biaxially oriented polyethylene terephthalate film.

8. The packaging bag according to claim 6, wherein the oxygen-absorbing layer is an oxygen-absorbing adhesive layer which contains an isocyanate-based curing agent and an oxygen-absorbing polyester polyol having an unsaturated alicyclic structure as an oxygen absorbing moiety.

9. The packaging bag according to claim 8, wherein the oxygen-absorbing polyester polyol is a polyester polyol which includes a structural unit derived from tetrahydrophthalic acid or a derivative thereof.

10. A packaging structure in which an adhesive patch is packed with the packaging bag according to claim 6.

* * * * *